(12) United States Patent
Hara et al.

(10) Patent No.: US 12,478,904 B2
(45) Date of Patent: Nov. 25, 2025

(54) AIR FILTER MEDIUM AND AIR FILTER PRODUCT

(71) Applicant: DAIKIN INDUSTRIES, LTD., Osaka (JP)

(72) Inventors: Satoshi Hara, Osaka (JP); Hiroaki Shintani, Tokyo (JP); Yoshitaka Ito, Tokyo (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 19 days.

(21) Appl. No.: 18/411,875

(22) Filed: Jan. 12, 2024

(65) Prior Publication Data

US 2024/0149196 A1     May 9, 2024

Related U.S. Application Data

(60) Division of application No. 17/680,948, filed on Feb. 25, 2022, now abandoned, which is a continuation of
(Continued)

(30) Foreign Application Priority Data

Aug. 30, 2019   (JP) ................................. 2019-158603

(51) Int. Cl.
    *B01D 39/00*        (2006.01)
    *B01D 39/16*        (2006.01)
    (Continued)

(52) U.S. Cl.
    CPC ......... *B01D 39/1623* (2013.01); *D04H 3/016* (2013.01); *B01D 46/023* (2013.01);
(Continued)

(58) Field of Classification Search
    CPC .............. B01D 39/1623; B01D 46/023; B01D 2239/0618; B01D 2239/0636;
(Continued)

(56) References Cited

U.S. PATENT DOCUMENTS 5,099,026 A    3/1992   Crater et al.
5,871,836 A    2/1999   Schultink et al.
(Continued)

FOREIGN PATENT DOCUMENTS

EP     3 332 856 A1    6/2018
JP     2-91262 A    3/1990
(Continued)

OTHER PUBLICATIONS

Extended European Search Report for European Application No. 20858555.4, dated Aug. 16, 2023.
(Continued)

*Primary Examiner* — T. Bennett Mckenzie
(74) *Attorney, Agent, or Firm* — Birch, Stewart, Kolasch & Birch, LLP (57) ABSTRACT

A method of producing an air filter includes a first step of preparing a tow band and a second step of obtaining a filter medium layer that includes first fibers obtained by applying tension to the tow band to spread the tow band and the first fibers having an average fiber diameter of 5 µm or more and 50 µm or less and second fibers disposed in gaps between the first fibers and having an average fiber diameter of 30 nm or more and 1 µm or less. The second fibers are drawn out from the particulate resin by drawing the particulate resin, and the particulate resin is drawn by separating the first fibers from each other so that a gap is formed between the first fibers during the spreading of the tow band.

20 Claims, 6 Drawing Sheets

Related U.S. Application Data application No. PCT/JP2020/032655, filed on Aug. 28, 2020.

(51) Int. Cl.
*D04H 3/016* (2012.01)
*B01D 46/02* (2006.01)

(52) U.S. Cl.
CPC ............... *B01D 2239/0618* (2013.01); *B01D 2239/0636* (2013.01); *B01D 2239/10* (2013.01); *B01D 2239/1233* (2013.01); *B01D 2239/1258* (2013.01); *D10B 2505/04* (2013.01)

(58) Field of Classification Search
CPC ........ B01D 2239/10; B01D 2239/1233; B01D 2239/1258; B01D 46/0001; B01D 2239/0233; B01D 2239/025; B01D 2239/0258; B01D 2239/0622; B01D 2239/0631; B01D 2239/064; B01D 2239/1291; B01D 39/18; D04H 3/016; D04H 3/018; D04H 3/04; D04H 5/08; D10B 2505/04
USPC .......................................................... 55/528
See application file for complete search history.

(56) References Cited

U.S. PATENT DOCUMENTS

| | | |
|---|---|---|
| 2005/0026526 A1 | 2/2005 | Verdegan et al. |
| 2010/0285101 A1 | 11/2010 | Moore et al. |
| 2013/0037481 A1 | 2/2013 | Lalouch et al. |
| 2013/0291876 A1 | 11/2013 | Angadjivand et al. |
| 2015/0053627 A1 | 2/2015 | Silin et al. |
| 2015/0157969 A1 | 6/2015 | Sealey et al. |
| 2015/0298036 A1 | 10/2015 | Clayton et al. |
| 2016/0038869 A1 | 2/2016 | Krause et al. |
| 2016/0367922 A1 | 12/2016 | Kamiyama |
| 2018/0236392 A1 | 8/2018 | Murakami et al. |
| 2021/0236971 A1 | 8/2021 | Umebayashi |

FOREIGN PATENT DOCUMENTS

| | | | |
|---|---|---|---|
| JP | 11-104417 A | | 4/1999 |
| JP | 2004-188355 A | | 7/2004 |
| JP | 2012188774 A | * | 10/2012 |
| JP | 2017-35684 A | | 2/2017 |
| JP | 2019-77962 A | | 5/2019 |
| WO | WO 2008/090904 A1 | | 7/2008 |
| WO | WO 2013/084760 A1 | | 6/2013 |
| WO | WO 2015/115418 A1 | | 8/2015 |

OTHER PUBLICATIONS

International Preliminary Report on Patentability and English translation of the Written Opinion of the International Search Authority, for International Application No. PCT/JP2020/032655, mailed Mar. 10, 2022.

International Search Report (PCT/ISA/210) issued in PCT/JP2020/032655, dated Dec. 1, 2020.

Written Opinion of the International Searching Authority (PCT/ISA/237) for PCT/JP2020/032655, dated Dec. 1, 2020.

* cited by examiner

AIR FILTER MEDIUM AND AIR FILTER PRODUCT

CROSS REFERENCE TO RELATED APPLICATIONS

This application is a Divisional application of copending application Ser. No. 17/680,948, filed on Feb. 25, 2022, which is a Continuation of PCT International Application No. PCT/JP2020/032655, filed on Aug. 28, 2020, which claims priority under 35 U.S.C. 119(a) to Patent Application No. 2019-158603, filed in Japan on Aug. 30, 2019, all of which are hereby expressly incorporated by reference into the present application.

TECHNICAL FIELD

The present disclosure relates to an air filter medium and an air filter product.

BACKGROUND ART

Air filters are classified into, for example, ULPA (ultra low penetration air) filters, HEPA (high efficiency particulate air) filters, and medium efficiency particulate air filters in accordance with the collection efficiency for particles having a particular particle size. These air filters are used in different applications in accordance with their performance.

With regard to these air filters, for example, PTL 1 (Japanese Unexamined Patent Application Publication No. 2017-35684) proposes an air filter that suppresses clogging and achieves a long life by using a filter medium in which fibers with a small fiber diameter and fibers with a large fiber diameter are mixed.

SUMMARY

An air filter medium according to a first aspect includes a filter medium layer. The filter medium layer includes first fibers and second fibers. The first fibers have an average fiber diameter of 5 µm or more and 50 µm or less. The second fibers are disposed in gaps between the first fibers and have an average fiber diameter of 30 nm or more and 11 µm or less.

DESCRIPTION OF EMBODIMENTS

An air filter medium and an air filter product will be specifically described below with reference to examples.

(1) Air Filter Medium

An air filter medium has a filter medium layer.

The air filter medium may be configured to have a single sheet-like filter medium layer or may be configured such that a plurality of filter medium layers are stacked in a direction of passage of air flow.

Figure 1:
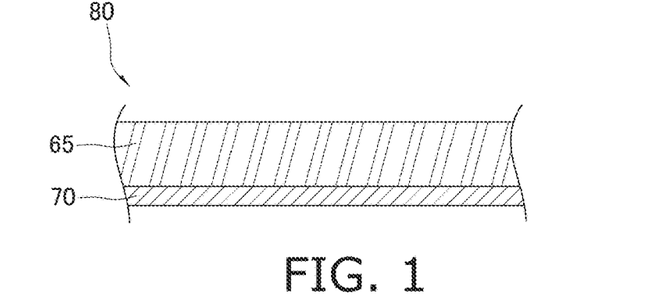
FIG. 1 is a schematic structural view illustrating one embodiment of an air filter medium.

The air filter medium may be, for example, an air filter medium 80 having a structure in which a filter medium layer 65 and an air-permeable support member 70 are stacked or bonded, as illustrated in FIG. 1. The air-permeable support member 70 may be disposed on the windward side with respect to the filter medium layer 65, may be disposed on the leeward side, or may be disposed on both the windward side and the leeward side.

Preferred examples of such an air-permeable support member 70 include a polyethylene terephthalate (PET) fiber nonwoven fabric, a polybutylene terephthalate (PBT) fiber nonwoven fabric, a nonwoven fabric having a core-sheath structure in which PET is used as the core component and polyethylene (PE) is used as the sheath component (PET/PE core/sheath nonwoven fabric), a nonwoven fabric having a core-sheath structure in which PET is used as the core component and PBT is used as the sheath component (PET/PBT core/sheath nonwoven fabric), a nonwoven fabric having a core-sheath structure in which a high-melting-point PET is used as the core component and a low-melting-point PET is used as the sheath component (high-melting-point PET/low-melting-point PET core/sheath nonwoven fabric), a nonwoven fabric formed of a composite fiber of PET fibers and PBT fibers, and a nonwoven fabric formed of composite fibers of high-melting-point PET fibers and low-melting-point PET fibers. Of these, a nonwoven fabric having heat fusibility is preferred.

The basis weight of the nonwoven fabric used in the air-permeable support member 70 is not limited but can be, for example, 15 g/m2 or more and 100 g/m2 or less. The film thickness of the nonwoven fabric used in the air-permeable support member 70 may be preferably 0.1 mm or more and 1.0 mm or less. With regard to the air-permeable support member 70, a pressure loss determined when air is passed through the air-permeable support member 70 at a flow velocity of 5.3 cm/s is smaller than that of the filter medium layer and is preferably 10 Pa or less, and more preferably substantially zero.

Figure 2:
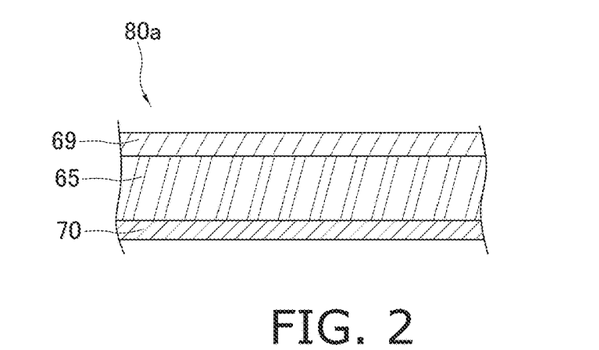
FIG. 2 is a schematic structural view illustrating one embodiment of an air filter medium.

The air filter medium may be an air filter medium 80a that includes a pre-collection layer 69 for reducing the dust collection load in the filter medium layer 65 on the windward side with respect to the filter medium layer 65, as illustrated in FIG. 2. Here, the air filter medium 80a may also include an air-permeable support member 70 as described above.

The pre-collection layer 69 may be formed of, for example, at least one or two or more of polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), and polyurethane (PU). The pre-collection layer 69 may be obtained by a melt-blown process. With regard to the pre-collection layer 69, the pressure loss determined when air is passed through the pre-collection layer 69 at a flow velocity of 5.3 cm/s is preferably smaller than that of the filter medium layer 65 and larger than that of the air-permeable support member 70. In addition, with regard to the pre-collection layer 69, a collection efficiency for NaCl particles having a particle size of 0.4 µm is preferably lower than that of the filter medium layer 65 and higher than that of the air-permeable support member 70.

(1-1) Filter Medium Layer

The filter medium layer includes first fibers having an average fiber diameter of 5 µm or more and 50 µm or less and second fibers disposed in gaps between the first fibers and having an average fiber diameter of 30 nm or more and 1 µm or less. The average fiber diameter of the first fibers can be specified as, for example, an average outer diameter of fibers mainly constituted from portions having a fiber diameter of 5 µm or more. Similarly, the average fiber diameter of the second fibers can be specified as, for example, an average outer diameter of fibers mainly constituted from portions having a fiber diameter of less than 5 µm.

The first fibers and the second fibers are preferably present such that the second fibers enter between the first fibers and the first and second fibers are mixed with each other, and preferably form a composite film in which the first fibers and the second fibers are entangled so as not to be separated from each other.

Each of the average fiber diameters of the first fibers and the second fibers can be evaluated on the basis of fibers present in a predetermined region of an image observed with a microscope or the like.

The thickness of the filter medium layer is preferably 3 mm or more and more preferably 4 mm or more from the viewpoint that more dust can be collected within the range of the thickness and a long life can be achieved. The thickness of the filter medium layer is, for example, 10 mm or less and preferably 7 mm or less from the viewpoint of suppressing the phenomenon that the first fibers become excessively thick and a sufficient number of second fibers cannot be positioned between the first fibers.

The basis weight of the filter medium layer can be, for example, 100 g/m² or more and 400 g/m² or less and is preferably 170 g/m² or more and 230 g/m² or less.

The pressure loss determined when air is passed through the filter medium layer at a flow velocity of 5.3 cm/s may be 35 Pa or less and is preferably 30 Pa or less, and more preferably 25 Pa or less. The pressure loss determined when air is passed through the filter medium layer at a flow velocity of 5.3 cm/s is, for example, 3 Pa or more and may be 5 Pa or more, 10 Pa or more, and 15 Pa or more.

The collection efficiency of the filter medium layer for NaCl particles having a particle size of 0.4 µm may be 35% or more and is preferably 40% or more, and more preferably 43% or more. The collection efficiency of the filter medium layer for NaCl particles having a particle size of 0.4 µm can be, for example, 99% or less and may be 90% or less, and 80% or less.

A PF value of the filter medium layer is preferably 16 or more and more preferably 19 or more, the PF value being defined by the following formula: PF value={−log((100−collection efficiency (%))/100)}/(pressure loss (Pa)/1000).

When air containing NaCl particles having a particle size of 0.4 µm is continuously passed through the filter medium layer at a flow velocity of 5.3 cm/s, a dust-holding capacity for the NaCl particles at which a pressure loss increases by 50 Pa is preferably 18 g/m² or more, and more preferably 20 g/m² or more. This enables the life of the air filter medium to be sufficiently extended. Herein, the life can be, for example, a life until the pressure loss increases by 50 Pa from the start of the use when air is passed at a flow velocity of 5.3 cm/s.

(1-2) First Fibers

The average fiber diameter of the first fibers is 5 µm or more and 50 µm or less, preferably 8 µm or more and 30 µm or less, and more preferably 10 µm or more and 20 µm or less. By ensuring a thickness of the first fibers of 5 µm or more, the first fibers can be caused to function as a stable skeleton in the air filter medium, and deformation of the filter medium can be suppressed even in the state where the filter medium is exposed to an air flow during use. In addition, even if the thickness of the filter medium layer is increased, the pressure loss can be suppressed to be low. On the other hand, when the thickness of the first fibers is 50 µm or less, it is possible to suppress the leakage of dust collection due to excessively large gaps between the first fibers.

The first fibers preferably mainly include, for example, one or two or more selected from the group consisting of cellulose acetate, rayon, polypropylene (PP), polyethylene terephthalate (PET), and polyethylene (PE). Of these, the first fibers preferably include cellulose acetate from the viewpoints that an increase in the fiber diameter due to moisture absorption can be suppressed by low moisture absorbency to suppress the growth of mold, degradation in a high-temperature environment can be suppressed, and a high damage resistance is also achieved. The cellulose acetate may be cellulose diacetate, cellulose triacetate, or a mixture thereof. These first fibers function as fibers having a relatively large fiber diameter and can stably widely ensure the spaces between the first fibers.

The first fibers may be, for example, fibers obtained by a melt-blowing process, fibers obtained by an electrospinning process, fibers obtained by a sea-island process, or fibers obtained by spreading a tow band. The tow band is obtained by crimping a tow formed by combining a plurality of filaments which are the first fibers. The tow is, for example, a fiber bundle obtained by gathering a plurality of spun yarns and may have a sheet shape. The fiber diameter and the sectional shape of the first fibers can be appropriately adjusted by, for example, changing the peripheral edge shape of a spinning hole at the stage of spinning the first fibers by a dry spinning process. The tow band can be spread by applying tension to the tow band in the longitudinal direction. Spreading of the tow band releases fibers and moves the arrangement of crimped fibers to reduce overlapping of mountain portions and valley portions, thereby changing the tow band to a bulky form. In the air filter medium, the use of the first fibers obtained by spreading the crimped tow band easily ensures the gaps between the first fibers, enables larger portions of second fibers to sufficiently enter the gaps between the first fibers to ensure a wide space in which dust can be held. Thus, clogging can be suppressed, and a long life can be achieved.

The number of crimps in the tow band can be, for example, 25 crimps or more and 60 crimps or less per 25 mm in the longitudinal direction and is preferably 30 crimps or more and 40 crimps or less per 25 mm in the longitudinal direction.

As described later, the air filter medium may be, for example, an air filter medium obtained by previously causing a substance that generates second fibers to adhere, in a scattered manner, to a tow band before being spread, and then simultaneously generating second fibers when first fibers are generated by spreading the tow band. This enables larger portions of the second fibers to be disposed between the first fibers while the second fibers are sufficiently caused to adhere to the first fibers to stabilize the unified state of the first and second fibers. Thus, a composite film in which the first fibers and the second fibers are homogeneously mixed together can be obtained. In the case where the filter medium layer is obtained by simultaneously generating second fibers during generation of first fibers by spreading a tow band, an aqueous dispersion in which a particulate resin serving as a source of the second fibers is dispersed in water is preferably applied to the tow band to thereby cause the particulate resin serving as the source of the second fibers to adhere to the tow band. In this case, from the viewpoint of enhancing the affinity of the tow band to the aqueous dispersion, the tow band is preferably one having a small contact angle θ1 of water immediately after a water droplet is dropped on the surface of the tow band. It is preferable to spread a tow band to which one or both of an oil emulsion that contains water and textile oil used during spinning and water used during crimping adhere.

(1-3) Second Fibers

The second fibers are fibers that are disposed in gaps between the first fibers and have an average fiber diameter of 30 nm or more and 1 μm or less. The average fiber diameter of the second fibers is preferably 40 nm or more and 500 nm or less, and more preferably 70 nm or more and 150 nm or less from the viewpoint that the second fibers are located between the first fibers and can efficiently collect dust.

The second fibers also preferably have heat resistance and chemical resistance as in the first fibers. The second fibers preferably include one or two or more fibrillated polymers selected from the group consisting of a fluororesin, polypropylene, polyethylene, and polyamide. In particular, the second fibers preferably include a fluororesin and preferably include a fluororesin in an amount of 50% by weight or more from the viewpoint of good heat resistance and chemical resistance and from the viewpoint that sufficiently thin fibers are easily obtained.

Examples of the fluororesin include modified polytetrafluoroethylene, homo-polytetrafluoroethylene, and mixtures thereof. The modified polytetrafluoroethylene (modified PTFE) is obtained by polymerization of tetrafluoroethylene (TFE) and a monomer other than TFE (modifying monomer). The modified PTFE may be a polymer that is uniformly modified by a modifying monomer or a mixture obtained by adding a modifying monomer at the beginning or end of polymerization reaction. The modifying monomer is not limited as long as the modifying monomer is copolymerizable with TFE, and, for example, a fluorine-containing monomer having an ethylenically unsaturated group can be used. Examples of the fluorine-containing monomer having an ethylenically unsaturated group include hexafluoropropylene (HFP), perfluoro(alkyl vinyl ethers) (PAVE), chlorotrifluoroethylene (CTFE), (perfluoromethyl)ethylene, (perfluorobutyl)ethylene, perfluorobutene-1, perfluorohexene-1, and perfluorononene-1. Examples of the PAVE include perfluoro(methyl vinyl ether) (PMVE), perfluoro(ethyl vinyl ether) (PEVE), and perfluoro(propyl vinyl ether) (PPVE). The monomers other than TFE may be used alone or in combination of two or more thereof. A total amount of repeating units based on the monomers other than TFE is preferably 1% by mass or less and more preferably 0.5% by mass or less of a total amount of repeating units based on all the monomers that form the polytetrafluoroethylene.

The polytetrafluoroethylene can be obtained by, for example, emulsion polymerization or suspension polymerization in which TFE or TFE and the other modifying monomer are polymerized in an aqueous medium containing a dispersant and a polymerization initiator. The polytetrafluoroethylene may form a fine powder obtained by emulsion polymerization. The fine powder can be obtained by collecting polytetrafluoroethylene fine particles from a polytetrafluoroethylene aqueous dispersion obtained by the emulsion polymerization and aggregating the fine particles followed by drying. The average particle size of the fine powder is preferably 100 to 1000 μm and more preferably 400 to 600 μm. Herein, the average particle size can be measured in accordance with ASTM D 1457.

Such a fine powder composed of polytetrafluoroethylene has good extrudability and can be subjected to paste extrusion at an extrusion pressure of, for example, 20 MPa or less. Note that the extrusion pressure is one measured when paste extrusion is performed through an orifice (diameter: 2.5 cm, land length: 1.1 cm, entrance angle: 30°) under the conditions of a reduction ratio of 100 and an extrusion speed of 51 cm/min, at 25° C.

Fibers of polytetrafluoroethylene can be generated by subjecting the above fine powder composed of polytetrafluoroethylene to paste extrusion molding, following by rolling and further drawing.

The polytetrafluoroethylene is preferably one that is easily fibrillated during the production of the filter medium layer, that has a molecular weight at which fibrils having a long fiber length are obtained, that has a standard specific gravity (SSG) of 2.130 or more and 2.230 or less, and that does not substantially subjected to melt flow because of a high melt viscosity. Regarding such polytetrafluoroethylene, reference can be made to polytetrafluoroethylene described in, for example, International Publication No. 2013/157647. The standard specific gravity (SSG) can be measured by a water displacement method based on ASTM D-792 using a sample formed in accordance with ASTM D4895-89.

The second fibers may be, for example, fibers obtained as a fibrillated polymer subjected to drawing, fibers obtained by a melt-blowing process, fibers obtained by an electrospinning process, or fibers obtained by a sea-island process.

In the case where the second fibers are obtained as a fibrillated polymer subjected to drawing, the second fibers can be obtained by drawing fibrillatable polymer particles. Such fibrillatable polymer particles are preferably composed of a polymer having a lamellar structure in which polymer chains are linked and folded and are preferably composed of a polymer that can be subjected to paste extrusion molding. For example, second fibers obtained by drawing fibrillatable polymer particles can be present as fibers extending from a particulate resin having the same composition as the second fibers together with the particulate resin.

In the case where the second fibers are obtained by the melt-blowing process, the second fibers can be obtained by spinning a molten polymer discharged from each nozzle in a high-temperature jet stream using a plurality of nozzles having a predetermined hole diameter. Here, the resulting fiber diameter can be changed by adjusting, for example, the polymer discharge temperature, the amount of discharge, and the amount of air as manufacturing conditions in the melt-blowing process, and fibers having a relatively small fiber diameter can be obtained by, for example, increasing the polymer discharge temperature, reducing the amount of discharge, and increasing the amount of air. A composite film in which first fibers and second fibers are mixed together can also be obtained by simultaneously generating first fibers by the melt-blowing process while generating second fibers by the melt-blowing process.

(1-4) Relationship Between First Fibers and Second Fibers

When the filter medium layer includes a particulate resin having the same composition as the second fibers, a ratio W1/W2 of a weight W1 of the first fibers to a total weight W2 of the second fibers and the particulate resin in the filter medium layer is preferably 3.0 or more and 18.0 or less. This enables both the function due to the first fibers and the function due to the second fibers to be sufficiently exhibited, and thus can extend the life while enhancing the collection efficiency.

When the filter medium layer includes a particulate resin having the same composition as the second fibers, a ratio V1/V2 of a volume V1 of the first fibers to a total volume V2 of the second fibers and the particulate resin in the filter medium layer is preferably 1.9 or more and 124.0 or less. This can generate, in a balanced manner, the function due to the first fibers to provide a space in which dust is collected and the function due to the second fibers to efficiently collect dust.

Preferably, the ratio W1/W2 of the weight W1 of the first fibers to the total weight W2 of the second fibers and the particulate resin is 3.0 or more and 18.0 or less, and the ratio V1/V2 of the volume V1 of the first fibers to the total volume V2 of the second fibers and the particulate resin is 1.9 or more and 124.0 or less.

The lower limit of a ratio D1/D2 of an outer diameter D1 of the first fibers to an outer diameter D2 of the second fibers may be, for example, 15.0 and is preferably 60.0. The upper limit of the ratio D1/D2 may be, for example, 1666.7 and is preferably 1300.0, more preferably 714.3, and still more preferably 300.0. This can sufficiently provide a space in which dust is collected, while suppressing the detachment of the second fibers from the first fibers.

(2) Air Filter Product 100

Figure 3:
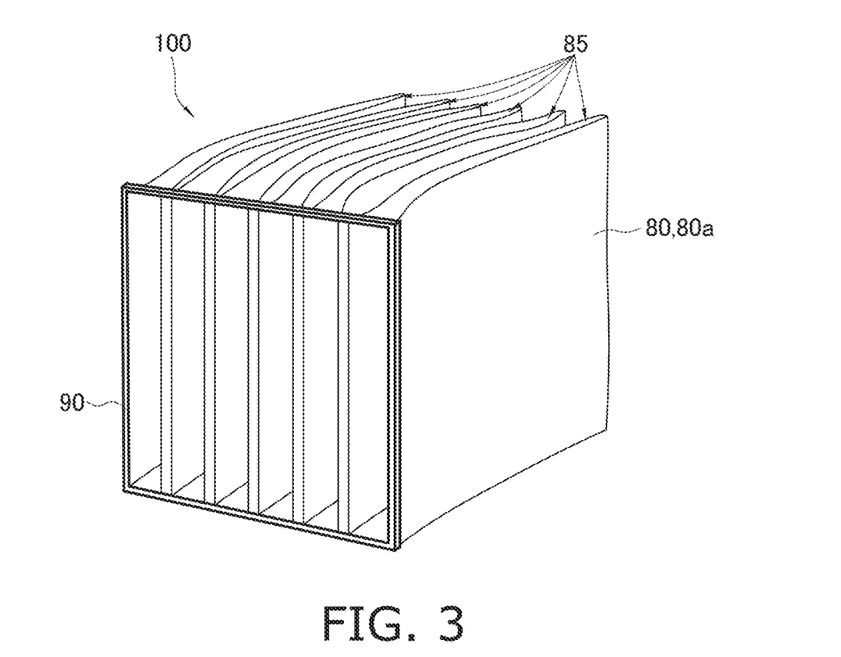
FIG. 3 is an external perspective view illustrating one embodiment of an air filter product.

FIG. 3 is an external perspective view of an air filter product 100 according to one embodiment.

The air filter product 100 has a structure in which pocket bodies 85 each having a bag shape formed by folding an air filter medium 80 are arranged and fixed to a frame body 90 such that the mouths of the pocket bodies 85 are connected to each other.

The air filter product 100 is called, for example, a pocket filter and includes a material with high rigidity only in the portion of the frame body 90, and each of the pocket bodies 85 is foldable. Thus, the air filter product 100 can be transported and stored in a reduced size.

The pocket bodies 85 each have a bag shape as a result of joining opposing filter medium portions that are folded back at the end of the downstream side by, for example, sewing, heat fusion, or using an adhesive in an upper end portion and a lower end portion. The pocket bodies 85 adjacent to each other are joined together in mouth portions thereof by, for example, sewing, heat fusion, or using an adhesive.

The gap between each pocket body 85 and the frame body 90 may be sealed with a sealing agent. Examples of the sealing agent include sealing agents composed of a resin such as an epoxy, acryl, or urethane-based resin.

(3) Production Method

An example of a method for producing a filter medium layer including first fibers and second fibers will be described below with reference to the drawings. The "upstream" and the "downstream" referred to below may represent the upstream and the downstream, respectively, in a conveying direction P of a tow band 64.

Figure 4:
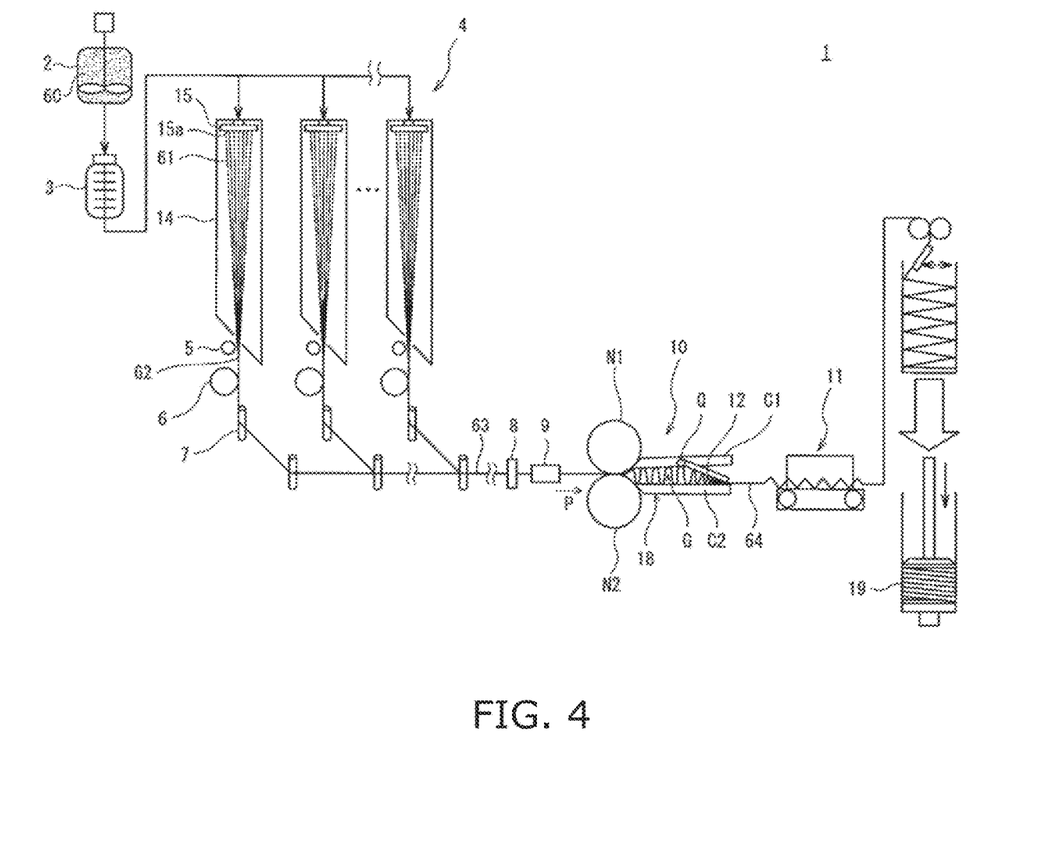
FIG. 4 is a schematic view of a tow band production apparatus according to one embodiment.

FIG. 4 is an overall view of a tow band production apparatus 1. The tow band production apparatus 1 spins filaments 61 which are first fibers by a dry spinning method. Furthermore, the tow band production apparatus 1 produces a yarn 62, an end 63, and a tow band 64 from a plurality of filaments 61. The filaments 61 can be constituted by the material described in the first fibers.

The tow band production apparatus 1 includes a mixing device 2, a filtering device 3, spinning units 4, oil impreg-nation units 5, godet rollers 6, guide pins 7, an impregnation device 8, a first drying device 9, a crimping device 10, and a second drying device 11.

The tow band production apparatus 1 can use a spinning solution 60 obtained by, for example, dissolving flakes of cellulose diacetate or the like in an organic solvent at a predetermined concentration. The tow band production apparatus 1 discharges the spinning solution 60 mixed using the mixing device 2 and filtered through the filtering device 3 from a plurality of spinning holes 15a of a spinneret 15 disposed on a spinning chimney 14 of each of the spinning units 4. The peripheral edge shape of each of the spinning holes 15a may have a predetermined shape such as a circular shape. A single-fiber fineness (filament denier FD) of the filaments 61 which are the first fibers to be produced can be adjusted by changing the diameters of the spinning holes 15a. The spinning solution 60 discharged from the respective spinning holes 15a is exposed to hot air to evaporate the organic solvent, thereby obtaining solid filaments 61.

A plurality of filaments 61 that have passed through one spinning chimney 14 are converged by a guide pin 7 to provide a yarn 62. The yarn 62 is impregnated with textile oil by an oil impregnation unit 5 in order to suppress charging and is then taken up by a godet roller 6.

The spinning unit 4, a drying unit, the oil impregnation unit 5, and a take-up unit that produce a yarn 62 are collectively called a station. A plurality of yarns 62 that have passed through respective stations are conveyed in an arrangement direction of the stations and sequentially accumulated or stacked. Thus, the plurality of yarns 62 are converged to form an end (tow) 63 which is a flat aggregate of the yarns 62. The end 63 is obtained by converging the plurality of yarns 62 to have a predetermined total fineness (total denier TD). The end 63 is conveyed and guided to the impregnation device 8. Note that the method for spinning the filaments 61 is not limited and may be a method other than the dry spinning method (such as a melt spinning method or a wet spinning method).

The impregnation device 8 impregnates the filaments 61 with a dispersion that contains a particulate resin serving as a source for generating second fibers through an impregnation roller (not illustrated) or the like, while conveying a plurality of first fibers (end 63 in this example). The dispersion may contain a liquid other than water but is preferably an aqueous dispersion in which a plurality of particles of the particulate resins are dispersed in water. The particulate resin is preferably constituted by the material described as the second fibers.

The particulate resin constitutes primary particles, and a plurality of particles of the particulate resin are bound together to constitute a secondary particle. When external force is applied to the second particle (in other words, two bound particles of the particulate resin) such that the particles of the particulate resin are separated from each other, fine fibers are drawn out from the inside of the particulate resin, and thus resin fibers which are second fibers are formed from the particulate resin. The dispersion preferably contains primary particles formed of a plurality of particles of the particulate resin in a state where the primary particles are dispersed in a solvent. When the impregnation device 8 impregnates the filaments 61 with the dispersion, the surfaces of the filaments 61 are impregnated with a plurality of particles of the particulate resin in a dispersed manner. The average particle size of the particulate resin is, for example, 100 nm or more and 600 nm or less and is preferably 250 nm or more and 350 nm or less. The average particle size refers to a median diameter (cumulative 50% diameter (D50))

calculated from the measurement results obtained by dynamic light scattering. The particulate resin is preferably obtained by extrusion molding.

The first drying device 9 dries at least part of the dispersion impregnated into the filaments 61. The adjustment of the degree of this drying can reduce the amount of particulate resin detached from the filaments 61 to easily adjust the weight ratio of the filaments 61 and the resin fibers.

The crimping device 10 crimps the filaments 61. The crimping device 10 has a pair of nip rollers N1 and N2 and a stuffing box 18. The pair of nip rollers N1 and N2 is arranged such that the axes thereof are parallel to each other and presses the end 63 between the circumferential surfaces thereof.

The stuffing box 18 is disposed on the downstream side of the pair of nip rollers N1 and N2 and has a pair of plate members C1 and C2 having plate surfaces extending in the conveying direction P and an urging member 12. The pair of plate members C1 and C2 is arranged such that the plate surfaces thereof face each other with a gap G therebetween and the gap G decreases from the upstream side toward the downstream side. The end 63 (plurality of filaments 61) that has passed through the pair of nip rollers N1 and N2 is conveyed into the gap G.

The urging member 12 is, for example, a plate member and extends along the plate surface of the plate member C1 in a direction perpendicular to the conveying direction P. An upstream end of the urging member 12 in the conveying direction P is rotatably supported by the plate member C1 around an axis line Q extending in the direction perpendicular to the conveying direction P along the plate surface of the plate member C1. The urging member 12 is urged toward the plate surface of the plate member C2 and presses the end 63 conveyed between the pair of plate members C1 and C2.

The end 63 is pressed by the pair of nip rollers N1 and N2 between the pair of nip rollers N1 and N2 and pushed into the inside of the stuffing box 18. The end 63 is pressed against the plate surface of the plate member C2 by the urging member 12 while being conveyed between the plate surfaces of the plate members C1 and C2 in a meandering manner. When the end 63 is pushed into the inside of the stuffing box 18 by the pair of nip rollers N1 and N2 with a force larger than a force applied to the end 63 from the plate members C1 and C2 and the urging member 12, crimps are provided to the end 63. Passage of the end 63 through the crimping device 10 forms a tow band 64. In addition, a plurality of particles of the particulate resin are joined together by being pressed in the crimping device 10 to form a secondary particle of the particulate resin.

The crimping device 10 adjusts the degree of crimp such as the number of crimps of the filaments 61 by adjusting a nip pressure of the pair of nip rollers N1 and N2 and can reduce the amount of dispersion detached from the filaments 61. The tow band 64 that has passed through the crimping device 10 is further dried by the second drying device 11. When a dispersion of a particulate resin is applied to the flat and smooth filaments 61 before crimping, the particulate resin can be uniformly disposed on the filaments 61 compared with the case where the dispersion is applied to irregular shaped portions after crimping.

The tow band 64 obtained as described above has a plurality of crimped filaments 61 and a plurality of particles of the particulate resin in a state of being bound to each other, the particles being dispersed inside the tow band 64 and supported by the filaments 61. Note that the use of the crimped filaments 61 enables the tow band 64 to be bulky.

The FD of the tow band 64 can be, for example, 1.0 or more and 10.0 or less and is preferably 2.0 or more and 6.0 or less from the viewpoints of retaining suitable strength of the filaments 61 and appropriately ensuring the gap between fibers. The tow band 64 that has passed through the second drying device 11 is accumulated and then packed under compression in a packing container 19 in the form of a veil.

Figure 5:
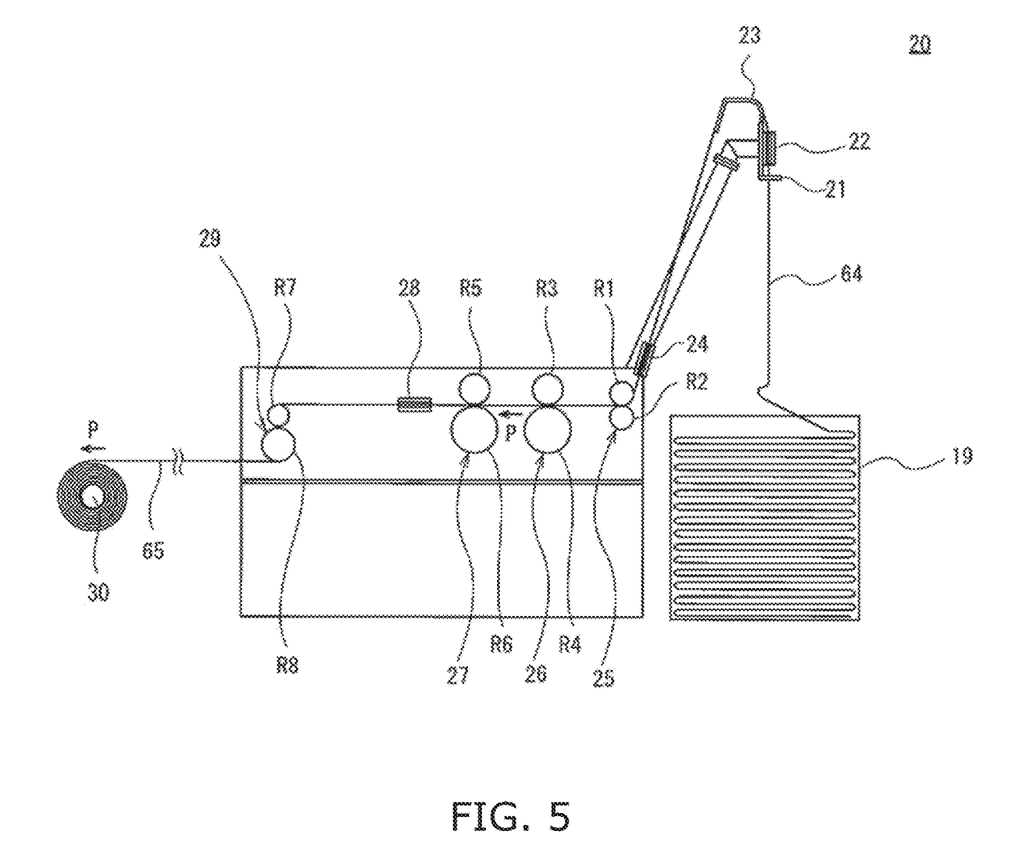
FIG. 5 is a schematic view of a filter medium production apparatus according to one embodiment.

FIG. 5 is an overall view of a filter medium production apparatus 20 according to one embodiment. The filter medium production apparatus 20 includes, for example, a converging ring 21, a first spreading unit 22, a turn baffle 23, a second spreading unit 24, a pre-tensioning roller pair 25, a first spreading roller pair 26, a second spreading roller pair 27, a third spreading unit 28, a conveying roller pair 29, and a take-up roller 30.

The converging ring 21 and the turn baffle 23 guide a veil-like tow band 64 pulled up from the inside of a packing container 19 from the upstream side to the downstream side. The first spreading unit 22, the second spreading unit 24, and the third spreading unit 28 spread the tow band 64 in the width direction thereof with gas such as pressurized air. The pre-tensioning roller pair 25, the first spreading roller pair 26, and the second spreading roller pair 27 spread the tow band 64 in the width direction and the conveying direction P while applying tension to the tow band 64 in the conveying direction P.

The pre-tensioning roller pair 25 has a pair of rollers R1 and R2 disposed such that their circumferential surfaces face each other. The first spreading roller pair 26 has a pair of rollers R3 and R4 disposed such that their circumferential surfaces face each other. The second spreading roller pair 27 has a pair of rollers R5 and R6 disposed such that their circumferential surfaces face each other. The conveying roller pair 29 has a pair of rollers R7 and R8 disposed such that their circumferential surfaces face each other. The conveying roller pair 29 conveys the tow band 64 that has passed through the second spreading roller pair 27 to the downstream side. The take-up roller 30 takes up the tow band 64 that has passed through the conveying roller pair 29.

When the filter medium production apparatus 20 is driven, the tow band 64 pulled up from the inside of the packing container 19 is inserted into the converging ring 21 and then spread by the first spreading unit 22 in the width direction. Subsequently, the tow band 64 is guided by the turn baffle 23 to the downstream side.

Next, the tow band 64 is further spread by the second spreading unit 24 in the width direction and is then sequentially inserted between the rollers R1 and R2, the rollers R3 and R4, and the rollers R5 and R6. The tow band 64 comes in contact with the rollers R1 to R6. The rotational speed of the pair of rollers R5 and R6 is higher than the rotational speed of the pair of rollers R3 and R4. Thus, the tow band 64 is spread in the conveying direction P and the width direction while tension is applied in the conveying direction P by the first spreading roller pair 26 and the second spreading roller pair 27.

When the tow band 64 is spread by the roller pairs 26 and 27 in the conveying direction P (the left-right direction of the plane of the figure) and the width direction (the direction perpendicular to the plane of the figure), tension acts on the filaments 61 and the particulate resin in the conveying direction P and the width direction. As a result, the plurality of filaments 61 in the tow band 64 are spread to obtain a plurality of first fibers. Furthermore, at this time, tension (drawing force) acts on the particulate resin such that particles of the particulate resin that are bound together are separated from each other, and fine second fibers are thereby pulled out from the particulate resin. As a result, the tow band 64 is converted into a fiber composite including a plurality of first fibers which are filaments 61 and a plurality of second fibers which are fine resin fibers.

The fiber diameter of the second fibers can be adjusted by the tension applied to the tow band 64 when the tow band 64 is spread. For example, an increase in the tension can decrease the fiber diameter of the second fibers and increase the length dimension of the second fibers. On the other hand, a decrease in the tension applied to the tow band 64 can increase the fiber diameter of the second fibers and decrease the length dimension of the second fibers.

The tow band 64 (fiber composite) that has passed through the second spreading roller pair 27 is inserted between the rollers R7 and R8 of the conveying roller pair 29. The rotational speed of the pair of rollers R7 and R8 is lower than the rotational speed of the pair of rollers R5 and R6. As a result, the tension acting on the tow band 64 between the first spreading roller pair 26 and the second spreading roller pair 27 in the conveying direction P is released between the second spreading roller pair 27 and the conveying roller pair 29. This release of the tension adjusts the tow band 64 to be bulky.

The tow band 64 that has passed through the conveying roller pair 29 is taken up by the take-up roller 30. The tow band 64 is cut to a predetermined length dimension to produce an air filter medium having a filter medium layer 65.

Figure 6:
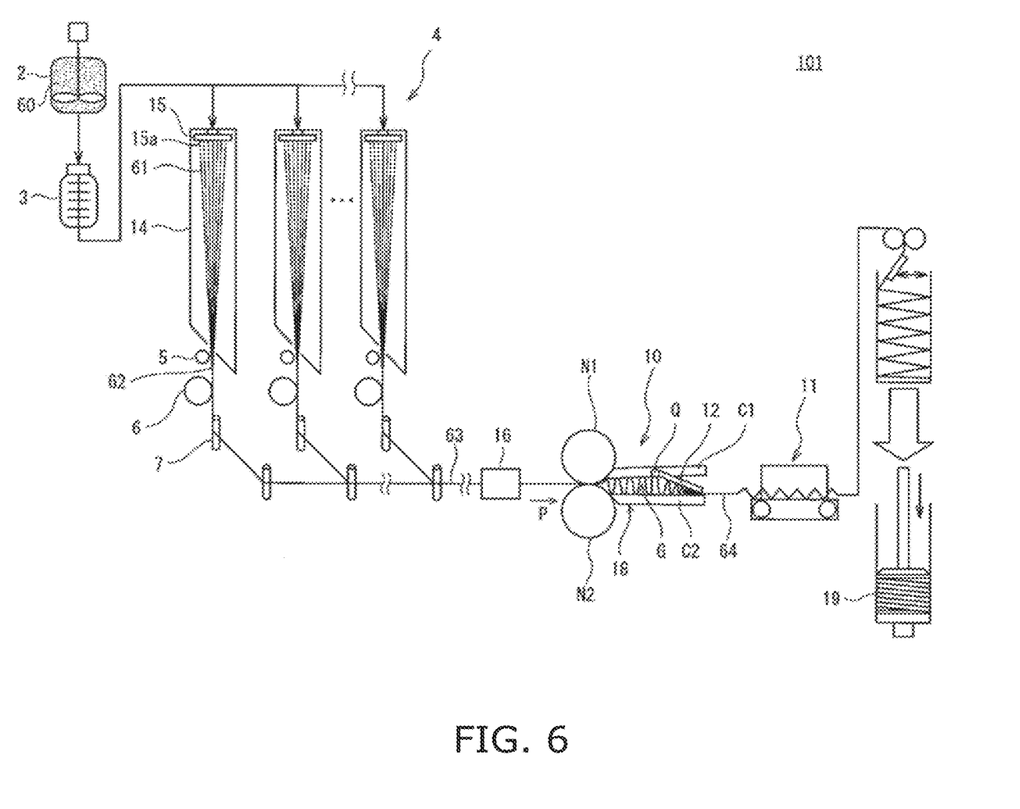
FIG. 6 is a schematic view of another example of a tow band production apparatus according to one embodiment.

For example, a tow band production apparatus 101 as illustrated in FIG. 6 may be used as a tow band production apparatus. This tow band production apparatus 101 includes neither the impregnation device 8 nor the first drying device 9 but includes a particulate substance addition device (feeder) 16 instead. The particulate substance addition device 16 is disposed on the upstream side of a crimping device 10 (in this example, on the downstream side of godet rollers 6 and on the upstream side of a crimping device 10) such that a particulate resin can be added to filaments 61 while the particulate resin remains a powder form. From the viewpoints of satisfactorily causing the particulate resin to adhere to the surfaces of the filaments 61 and suppressing charging, it is preferred that the filaments 61 to be introduced to the crimping device 10 have been impregnated with water or textile oil.

The method for producing a filter medium layer including first fibers and second fibers is not limited to the method described above, and the filter medium layer may be obtained by, for example, coating the tow band with a fibrillatable particulate polymer serving as a material of the second fibers, spreading the resulting composite, cutting the spread fiber composite to short fibers with a length of, for example, about 5 mm, and forming the short fibers into a nonwoven fabric by a technique such as needle-punching. The filter medium layer may be obtained by still another method in which a liquid mixture containing cellulose nanofibers and a dispersion medium is caused to adhere to a support having air permeability, followed by freeze-drying, as described in, for example, International Publication Nos. 2017-022052 and 2018-221063.

(4) Applications

The air filter medium and the air filter product according to this embodiment can be used in applications such as filters for ventilation, the filters being provided in ventilation routes connecting the outside and the inside of buildings such as offices, apartments, and hospitals, heat-resistant filters used in predetermined high-temperature environments, chemical-resistant filters used in spaces in which predetermined chemicals are handled, filters for exhaust gas treatment, filters for vacuum cleaners, and filters for gas turbines.

EXAMPLES

Examples 1 to 7 and Comparative Examples 1 to 3

An acetate fiber was used as a first fiber. Specifically, a fiber prepared by dissolving cellulose diacetate in acetone and then spinning the solution by dry spinning was used to obtain a fiber material of a tow. A PTFE fine powder ("POLYFLON fine powder F106" manufactured by DAIKIN INDUSTRIES, Ltd.), which is widely used as a grade for PTFE porous films, was used as a second fiber. A PTFE raw dispersion of the corresponding grade immediately after polymerization was stabilized by subsequently adding a surfactant such that the content became 10% by weight relative to the PTFE solid content to improve handleability and was used for tests. The PTFE used in Examples and Comparative Examples is the same.

The surface of a tow formed of the acetate fiber before being subjected to a crimping process was impregnated with the aqueous dispersion of PTFE, and the tow was then passed through a crimping device to form a composite of the PTFE and the acetate fiber. The amount of PTFE impregnated was adjusted by changing, for example, the concentration, viscosity, and coating amount of the coating agent applied to the tow surface. The composite that had passed through the crimping device was dried with hot air to remove water in the tow and PTFE. The composite after drying was passed through a roller spreading device at a room temperature of about 25° C. to thereby extend crimping, thus fabricating a bulky fiber structure in which second fibers derived from PTFE were disposed all around gaps between first fibers.

Air filter media of Examples and Comparative Examples were obtained by, for example, increasing the basis weight of the tow side used or stacking fiber structures so as to have a necessary basis weight.

Physical properties of each sample were measured and evaluated under the conditions described below.

For reference, a glass fiber filter medium that has been used to date is described as Reference Example.

(PTFE Fiber Diameter and Acetate Fiber Diameter)

A surface of a test sample is photographed with a scanning electron microscope (SEM) at a magnification of 1000 to 5000 times, two lines orthogonal to each other are drawn on a single captured image, and the width of a fiber image intersecting these lines is determined as a fiber diameter. The number of fibers measured here is 200 or more. The fiber diameters determined as described above were plotted on a lognormal scale such that the horizontal axis represented a fiber diameter and the vertical axis represented a cumulative frequency. A value at a cumulative frequency of 50% was defined as the average fiber diameter.

(Basis Weight of Air Filter Medium)

The basis weight was determined by dividing the mass (g) of a cut specimen having a rectangular shape of 4.0 cm×12.0 cm, the mass being measured with a precision balance, by the area (0.0048 $m^2$).

(Amount of PTFE Impregnated into Tow)

The impregnation amount in the tow surface was grasped from the production speed of the tow and the liquid flow rate of the PTFE dispersion applied during the production of the tow.

(Thickness of Air Filter Medium)

The thickness of one filter medium was determined by stacking five filter media to be measured, measuring the total thickness of the five filter media with a film thickness meter (Model: 1D-110MH, manufactured by Mitutoyo Corporation), and dividing the measured value by 5.

(Pressure Loss of Air Filter Medium)

A sample of an air filter medium having a fluororesin porous film was set in a filter medium holder having a cylindrical shape with a diameter of 100 mm. The filter medium holder was pressurized on the inlet side with a compressor, and the flow of air was adjusted such that the velocity of passage of air through the filter medium became 5.3 cm/s. The pressure was measured with a manometer on the upstream side and the downstream side of the test sample in the direction in which air flowed, and the difference in pressure between the upstream and downstream sides was determined as the pressure loss.

(Collection Efficiency of Air Filter Medium (NaCl Particles with Particle Size of 0.4 μm))

NaCl particles generated with an atomizer in accordance with the method for generating NaCl aerosol (pressure atomization method) in JIS B9928 Appendix 5 (specification) were classified with an electrostatic classifier (manufactured by TSI Incorporated) into particles having a particle size of 0.4 μm. The charge on the particles was neutralized by using americium-241, and the flow rate at which the particles passed was then adjusted to 5.3 cm/s. The numbers of particles before and after passage through the filter medium serving as a measurement specimen were determined with a particle counter (CNC, manufactured by TSI Incorporated), and the collection efficiency was calculated by the following formula.

Collection efficiency (%)=(CO/CI)×100

CO: Number of 0.4 μm NaCl particles collected by the measurement specimen
CI: Number of 0.4 μm NaCl particles supplied to the measurement specimen (PF value of air filter medium)

The PF value was calculated by the following formula: PF value={−log((100−collection efficiency (%))/100)}/(pressure loss (Pa)/1000) using the pressure loss and the collection efficiency.

(Dust-Holding Capacity of Air Filter Medium)

NaCl particles generated with an atomizer in accordance with the method for generating NaCl aerosol (pressure atomization method) in JIS B9928 Appendix 5 (specification) were passed over americium-241 serving as an α-ray radiation source so that the charged state of the particles became the same equilibrium charged state as atmospheric dust. After a filter medium serving as a measurement specimen was set in the same filter holder as that used in the measurement of the pressure loss, the NaCl particles were introduced to the upstream side of the filter medium, and the load of the NaCl particles was continued until the pressure loss of the filter increased by +50 Pa from the initial value. The dust-holding capacity was calculated by the following formula from the measurement of the weight of the filter medium before and after the load of the NaCl particles.

Dust-holding capacity $(g/m^2)=(MI-MO)/A$

MO: Weight (g) of test filter medium before load of NaCl particles
MI: Weight (g) of test filter medium after load of NaCl particles
A: Effective filter medium area (100 $cm^2$=0.01 $m^2$)

Figure 7:
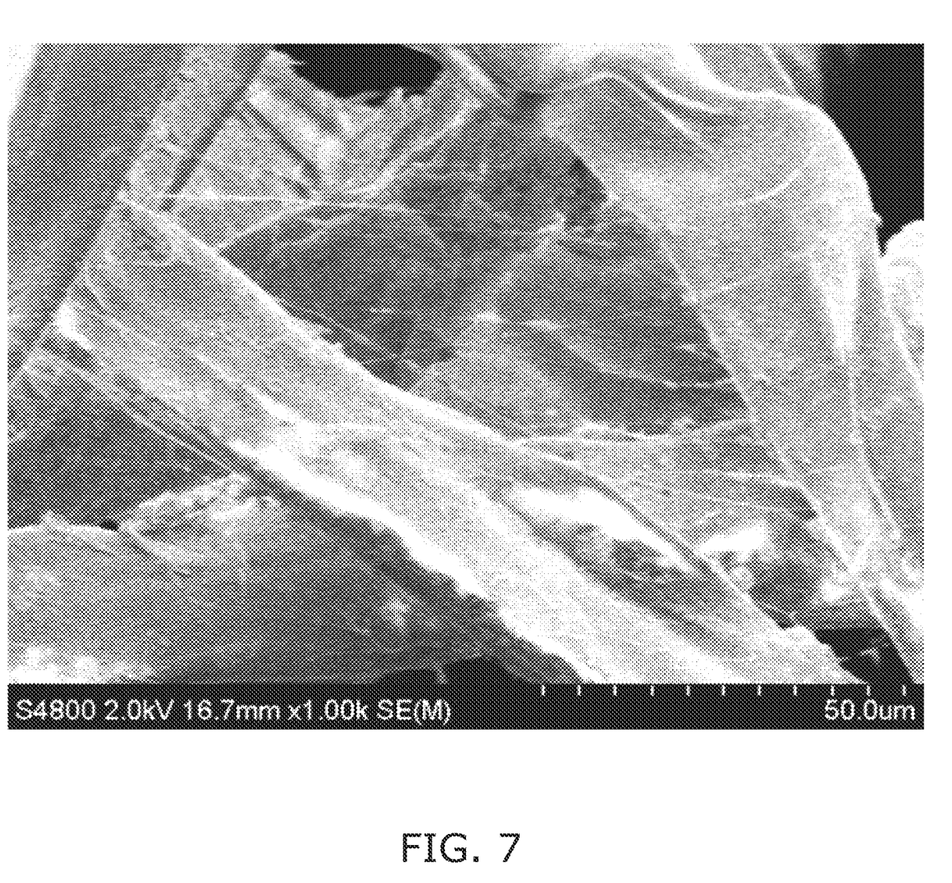
FIG. 7 is a SEM photograph of a filter medium according to Example 1.
Figure 8:
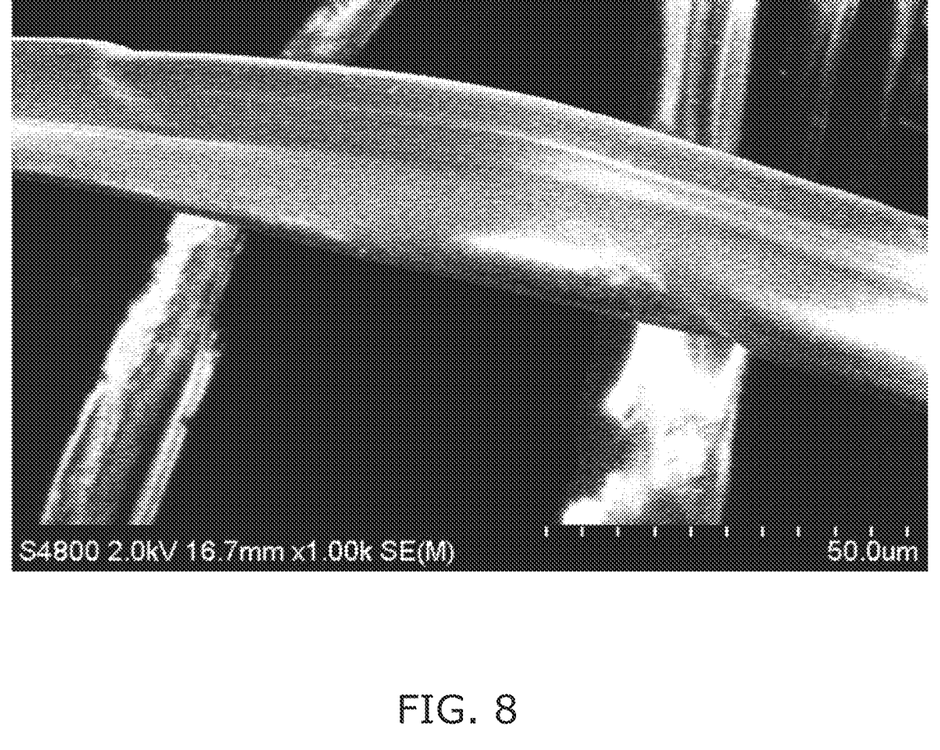
FIG. 8 is a SEM photograph of a filter medium according to Comparative Example 1.

The table below shows physical properties of the air filter medium (that is not in the form of a pocket air filter or the like but in the form of a sheet) of each of Examples and Comparative Examples. FIG. 7 is a SEM photograph of Example 1, and FIG. 8 is a SEM photograph of Comparative Example 1.

| | PTFE fiber diameter (nm) | Acetate fiber diameter (μm) | Basis weight (g/m²) | Amount of PTFE impregnated into tow (wt %) | Thickness (mm) | Pressure loss (Pa) | Collection efficiency @ 0.4 μm (%) | PF value (0.4 μm) | Dust-holding (+50 Pa) (g/m²) |
|---|---|---|---|---|---|---|---|---|---|
| Example 1 | 80 | 20 | 100 | 4 | 4 | 13 | 43.4 | 19 | 22 |
| Example 2 | 80 | 20 | 100 | 10 | 4 | 12 | 47 | 23 | 28 |
| Example 3 | 80 | 20 | 150 | 5 | 5 | 15 | 53.2 | 22 | 35 |
| Example 4 | 80 | 20 | 150 | 10 | 5 | 15 | 59.2 | 26 | 38 |
| Example 5 | 80 | 20 | 200 | 5 | 6 | 17 | 61 | 24 | 40 |
| Example 6 | 80 | 20 | 200 | 10 | 6 | 18 | 74.5 | 33 | 46 |
| Example 7 | 80 | 20 | 200 | 15 | 6 | 18 | 73.4 | 32 | 44 |
| Comparative Example 1 | | 20 | 200 | 0 | 6 | 17 | 11 | 3 | |
| Comparative Example 2 | 80 | 20 | 200 | 20 | 6 | 17 | | | |
| Comparative Example 3 | 80 | 20 | 100 | 2 | 4 | 12 | 30.1 | 13 | |
| Reference Example | (Glass fiber) | (Glass fiber) | 90 | | 3 | 40 | 74.8 | 15 | 15 |

In the example of Comparative Example 2, the amount of PTFE impregnated into the tow was excessively large, the acetate fiber could not be spread, and the PTFE also could not be fibrillated. Therefore, for the filter medium of Comparative Example 2, the collection efficiency could not be quantified, and the PF value and the dust-holding capacity also could not be quantified.

Regarding Comparative Examples 1 and 3, it took a considerable amount of time to increase the pressure loss, and the test could not be continued until an increase by 50 Pa was observed; therefore, the dust-holding capacity could not be quantified.

The embodiments of the present disclosure have been described above, and it is to be understood that the forms and details can be variously changed without departing from the gist and scope of the present disclosure described in the claims.

REFERENCE SIGNS LIST 65 filter medium layer
69 pre-collection layer
70 air-permeable support member
80 air filter medium
80a air filter medium
85 pocket body
90 frame body
100 air filter product

CITATION LIST

Patent Literature

PTL 1: Japanese Unexamined Patent Application Publication No. 2017-35684

The invention claimed is:

1. A method of producing an air filter medium, the method comprising:
    a first step of preparing a tow band obtained by crimping a tow formed by combining a plurality of filaments, a particulate resin being adhered to the tow band and
    a second step of obtaining a filter medium layer that includes
        first fibers obtained by applying tension to the tow band to spread the tow band and the first fibers having an average fiber diameter of 5 μm or more and 50 μm or less, and
        second fibers disposed in gaps between the first fibers and having an average fiber diameter of 30 nm or more and 1 μm or less,
    wherein
    the second fibers are drawn out from the particulate resin by drawing the particulate resin, and
    the particulate resin is drawn by separating the first fibers from each other so that a gap is formed between the first fibers during the spreading of the tow band.

2. The method of producing the air filter medium according to claim 1,
    wherein the first fibers include one or two or more selected from the group consisting of cellulose acetate, rayon, polypropylene, polyethylene terephthalate, and polyethylene.

3. The method of producing the air filter medium according to claim 2,
    wherein the second fibers comprise a fibrillated polymer.

4. The method of producing the air filter medium according to claim 3,
    wherein the fibrillated polymer includes a fluororesin.

5. The method of producing the air filter medium according to claim 1,
    wherein the second fibers comprise a fibrillated polymer.

6. The method of producing the air filter medium according to claim 5,
    wherein the fibrillated polymer includes a fluororesin.

7. The method of producing the air filter medium according to claim 6,
    wherein the filter medium layer includes the particulate resin having the same composition as the second fibers, and
    a ratio W1/W2 of a weight W1 of the first fibers to a total weight W2 of the second fibers and the particulate resin is 3.0 or more and 18.0 or less.

8. The method of producing the air filter medium according to claim 6,
    wherein the filter medium layer includes the particulate resin having the same composition as the second fibers, and
    a ratio V1/V2 of a volume V1 of the first fibers to a total volume V2 of the second fibers and the particulate resin is 1.9 or more and 124.0 or less.

9. The method of producing the air filter medium according to claim 6,
    wherein the filter medium layer has a thickness of 3 mm or more.

10. The method of producing the air filter medium according to claim 6,
    wherein the filter medium layer through which air is passed at a flow velocity of 5.3 cm/s has a pressure loss of 35 Pa or less.

11. The method of producing the air filter medium according to claim 6,
    wherein a collection efficiency of the filter medium layer for NaCl particles having a particle size of 0.4 μm is 35% or more.

12. The method of producing the air filter medium according to claim 6,
    wherein the filter medium layer has a PF value of 16 or more, the PF value being defined by the following formula: PF value=$\{-\log((100-\text{collection efficiency}(\%))/100)\}/(\text{pressure loss (Pa)}/1000)$.

13. The method of producing the air filter medium according to claim 6,
    wherein when air containing NaCl particles having a particle size of 0.4 μm is continuously passed through the filter medium layer at a flow velocity of 5.3 cm/s, a dust-holding capacity for the NaCl particles at which a pressure loss increases by 50 Pa is 18 g/m$^2$ or more.

14. The method of producing the air filter medium according to claim 1,
    wherein the filter medium layer includes the particulate resin having the same composition as the second fibers, and
    a ratio W1/W2 of a weight W1 of the first fibers to a total weight W2 of the second fibers and the particulate resin is 3.0 or more and 18.0 or less.

15. The method of producing the air filter medium according to claim 1,
    wherein the filter medium layer includes the particulate resin having the same composition as the second fibers, and
    a ratio V1/V2 of a volume V1 of the first fibers to a total volume V2 of the second fibers and the particulate resin is 1.9 or more and 124.0 or less.

16. The method of producing the air filter medium according to claim 1,
    wherein the filter medium layer has a thickness of 3 mm or more.

17. The method of producing the air filter medium according to claim 1,
    wherein the filter medium layer through which air is passed at a flow velocity of 5.3 cm/s has a pressure loss of 35 Pa or less.

18. The method of producing the air filter medium according to claim 1,
    wherein a collection efficiency of the filter medium layer for NaCl particles having a particle size of 0.4 μm is 35% or more.

19. The method of producing the air filter medium according to claim 1,
    wherein the filter medium layer has a PF value of 16 or more, the PF value being defined by the following formula: PF value={−log((100−collection efficiency (%))/100)}/(pressure loss (Pa)/1000).

20. The method of producing the air filter medium according to claim 1,
wherein when air containing NaCl particles having a particle size of 0.4 μm is continuously passed through the filter medium layer at a flow velocity of 5.3 cm/s, a dust-holding capacity for the NaCl particles at which a pressure loss increases by 50 Pa is 18 g/m² or more.

* * * * *